United States Patent [19]
Nielsen

[11] Patent Number: 5,819,302
[45] Date of Patent: Oct. 6, 1998

[54] METHOD AND APPARATUS FOR AUTOMATIC GENERATON OF DOCUMENTS WITH SINGLE-LAYERED BACKGROUNDS FROM DOCUMENTS WITH MULTI-LAYERED BACKGROUNDS

[75] Inventor: Jakob Nielsen, Atherton, Calif.

[73] Assignee: Sun Microsystems, Inc., Mountain View, Calif.

[21] Appl. No.: 639,742

[22] Filed: Apr. 29, 1996

[51] Int. Cl.[6] ..................................................... G06F 17/00
[52] U.S. Cl. ........................ 707/523; 707/512; 707/514; 707/902
[58] Field of Search ............................. 345/435; 707/523, 707/512, 513, 514, 515, 516, 517, 537, 902

[56] References Cited

U.S. PATENT DOCUMENTS

| | | | |
|---|---|---|---|
| 4,751,740 | 6/1988 | Wright | 707/514 |
| 4,933,880 | 6/1990 | Borgendale et al | 707/515 |
| 5,299,304 | 3/1994 | Williams et al | 707/523 |

OTHER PUBLICATIONS

"HiJaak Pro: User Guide." version 2.0. (Brookfield: Inset Systems) pp. 2–10 & 3–6, Jan. 1993.
Gonzales, Sean et al. "Specialty Web publishing tools." PC Magasine 14, No. 17 p. 236, Oct. 1995.
Nadile, Lisa et al. "MS Office plan: all net, all the time." PC Week 12, No. 50, p. 31, Dec. 1995.

*Primary Examiner*—Joseph R. Burwell
*Assistant Examiner*—John L. Young
*Attorney, Agent, or Firm*—Blakely Sokoloff Taylor & Zafman

[57] ABSTRACT

A method and apparatus are described for automatically converting documents from a first hypertext format that supports multi-layered backgrounds to a second hypertext format that does not support multi-layered backgrounds, such as HyperText Markup Language (HTML). According to the method, a target file is generated that stores all non-background elements of the document in the second hypertext format. A mechanism that reads the first hypertext format is used to display a current page of the document. A screen dump is made of the displayed page after removing or hiding the non-background elements. This process is repeated for all of the pages of the document. References to the graphics files generated by the screen dumps are embedded in the target file. The references cause the background elements of a page to be displayed behind non-background elements of the page when the document is displayed based upon the target file by a mechanism that reads the second hypertext format.

22 Claims, 5 Drawing Sheets

METHOD AND APPARATUS FOR AUTOMATIC GENERATON OF DOCUMENTS WITH SINGLE-LAYERED BACKGROUNDS FROM DOCUMENTS WITH MULTI-LAYERED BACKGROUNDS

BACKGROUND OF THE INVENTION

1. Field of the Invention

The present invention relates to generating Hypertext Markup Language (HTML) documents from hypertext documents created in non-HTML publishing systems. More particularly, the present invention relates to a method and apparatus for automatically generating HTML documents with single-layered backgrounds from corresponding hypertext documents with multi-layered backgrounds.

2. Background Information

Numerous powerful publishing systems have been developed to assist in the creation of structured hypertext documents. A document produced in a structured hypertext authoring system typically consists of a set of pages. Each page typically has foreground elements, such as text and graphical user interface components (e.g. buttons), superimposed over a backdrop. The backdrop is typically constructed from object-oriented graphics, with multiple elements on each page. Examples of publishing systems that support multi-layered backgrounds include HyperCard™ available from Apple Computer™ of Cupertino, Calif. and Frame Maker™ available from Adobe™, Inc. of Mountain View, Calif.

Backdrop elements may overlap with other backdrop elements. When backdrop elements overlap, only the frontmost backdrop element is visible in the region of overlap. Each hypertext page also inherits further backdrop graphics from "background pages". Typically, each page is assigned to a background page, and the graphic elements from the background page are used to form the backdrop for the page in combination with the graphic elements from the page itself, with the graphic elements from the page considered to be in front of the elements from the background.

The World Wide Web (the Web) has become one of the most popular forums for disseminating hypertext documents. The Web is a network of computers, interconnected by the Internet, that provides access to many thousands of hypermedia files. HTML files are transmitted from HTTP servers to Web browsers via the HyperText Transfer Protocol (HTTP). Upon receiving an HTML file, Web browsers construct and display a "page" of hypertext. Exemplary Web browsers include HotJava™ available from JavaSoft™ of Mountain View, Calif. and Navigator™ available from Netscape™ of Mountain View, Calif.

Currently, the Web only supports documents written in HTML. Consequently, documents developed in the hypertext authoring systems described above must be rewritten or translated into HTML. However, HTML supports only single-layered, or flat, backgrounds. The failure of HTML to support the multiple-layered backgrounds of other hypertext systems presents a significant obstacle to translation and dissemination of the vast amounts of pre-existing hypertext documents originally created in non-HTML authoring systems.

Not only does HTML's failure to support layered backgrounds obstruct the translation of pre-existing documents, it also discourages the use of non-HTML authoring systems for creating new documents intended for dissemination on the Web. Thus, authors that intend to publish their hypertext works on the Web are forced to select between powerful hypertext publishing systems with which they are already familiar, but which would involve an onerous task of translation, and HTML-specific authoring systems which may be less powerful and less familiar.

Based on the foregoing, it is desirable to have a method and apparatus that automatically generates HTML documents having single layered backgrounds based on a corresponding documents having multi-layered backgrounds. Such a method and apparatus would increase the portability of hypertext material that has already been developed in non-HTML publishing systems. Further, such a conversion tool will allow hypermedia authors to take advantage of the power of advanced hypertext publishing environments even when creating documents that are ultimately intended for the Web.

SUMMARY OF THE INVENTION

The present invention discloses a method and apparatus for automatically generating a plurality of original documents having single-layered backgrounds from a corresponding plurality of documents having multi-layered backgrounds.

According to the method, each page of a non-HTML hypertext document is processed by removing or hiding all non-background elements of the page, leaving only the multi-layered background. A screen dump is then made of the multi-layered background to generate a single-layered graphics file having the same appearance as the multi-layered background. The graphics file, an identifier, and the non-background elements are then used to generate a HyperText Markup Language (HTML) page having a single-layered background that appears identical to the original document.

DETAILED DESCRIPTION

A method and apparatus for automatically generating documents with single-layered, or flat, backgrounds from documents having multi-layered backgrounds is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
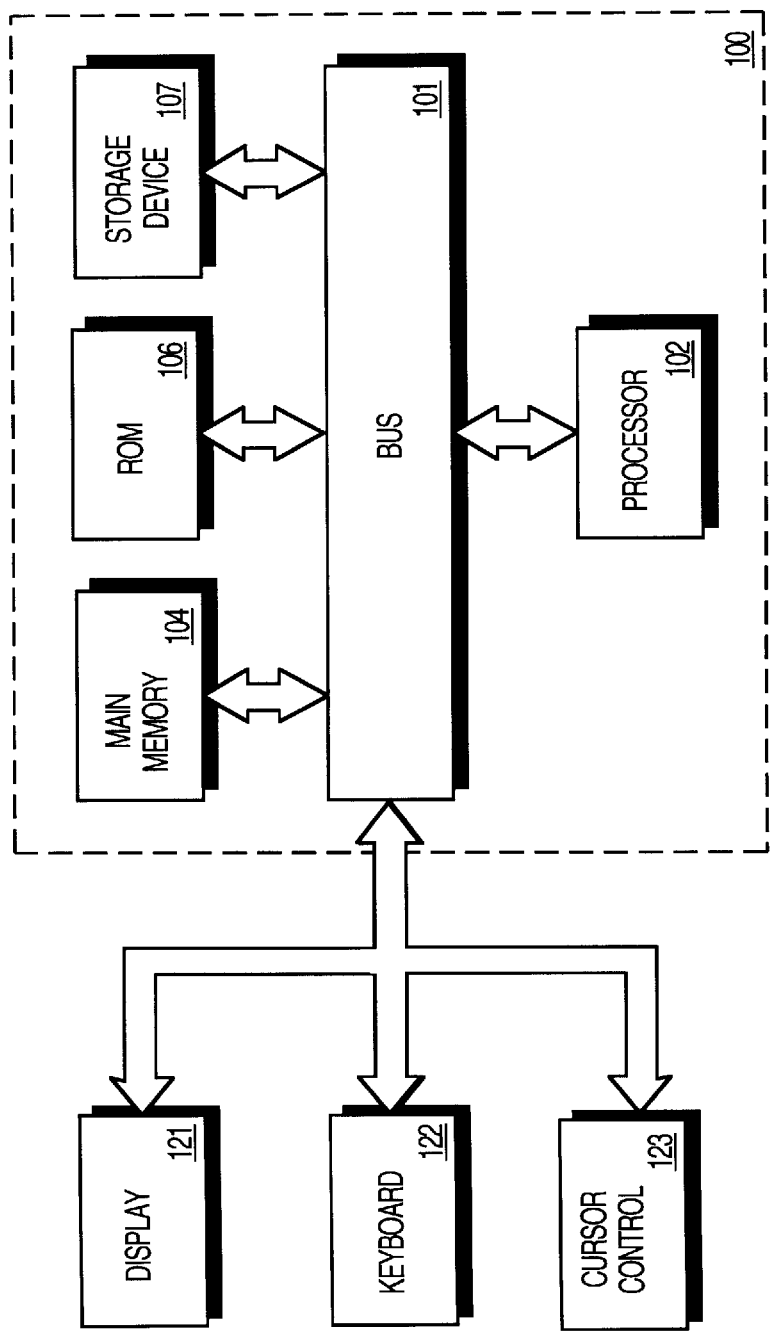
FIG. 1 is a block diagram of a computer system on which the present invention may be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disc and its corresponding drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to automatically generate documents having single-layered backgrounds from corresponding documents having multi-layered backgrounds. According to one embodiment, automatic generation of single-layered backgrounds from multi-layered backgrounds is performed by computer system 100 in response to processor 102 executing sequences of instructions contained in memory 104. Execution of the sequences of instructions contained in memory 104 causes processor 102 to automatically generate documents with single-layered backgrounds from documents having multi-layered backgrounds, as will be described hereafter. In alternative embodiments, hard-wired circuitry may be used in place of or in combination with software instructions to implement the present invention. Thus, the present invention is not limited to any specific combination of hardware circuitry and software.

Figure 2:
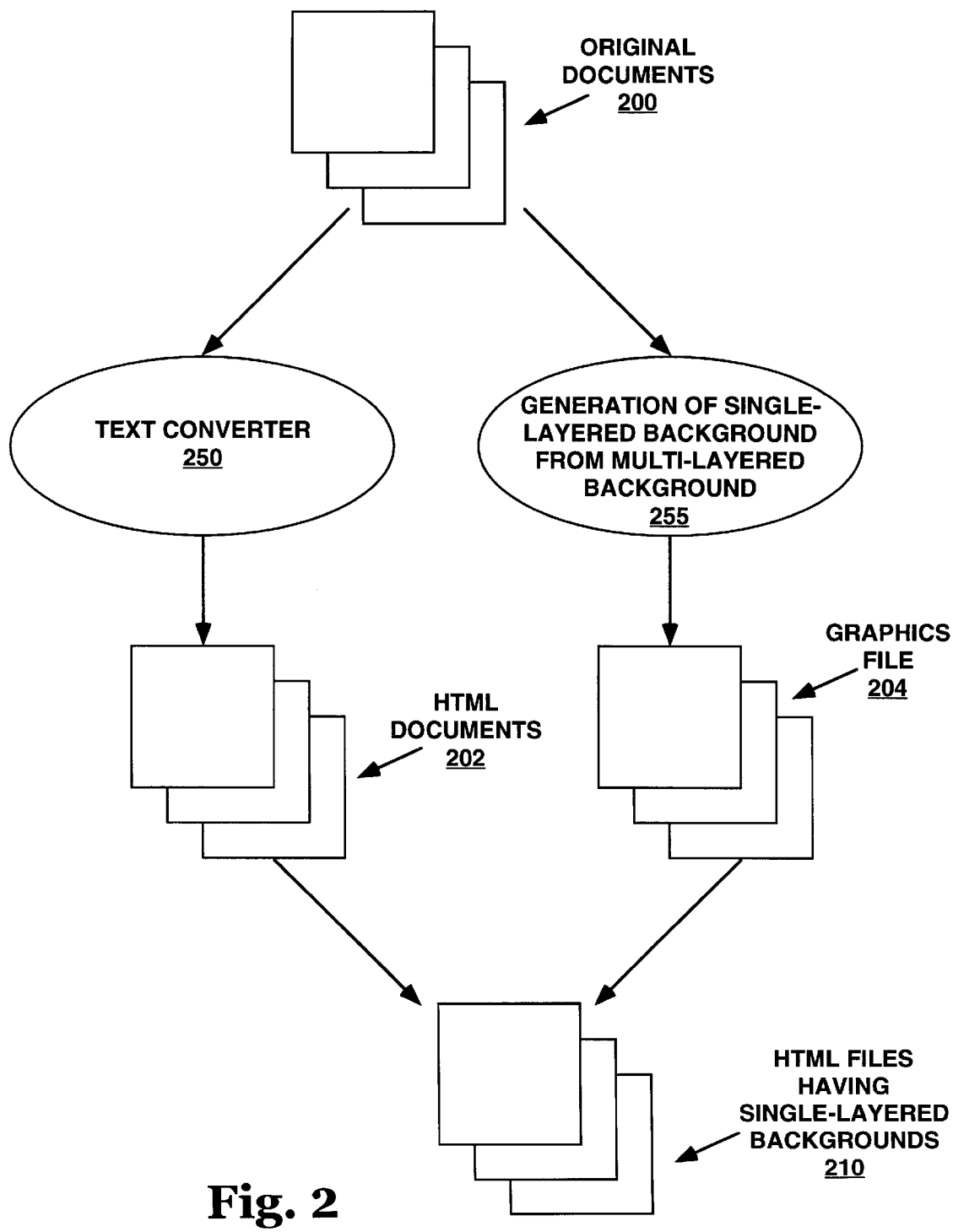
FIG. 2 is a diagram showing the process of generating HTML documents with single-layered backgrounds based on original documents having multi-layered backgrounds, according to one embodiment of the present invention.

FIG. 2 is a diagram showing a process for generating HTML files having single-layered backgrounds from original structured documents having multi-layered backgrounds. Original documents 200 are input to text converter 250, which generates HTML documents 202. Text converter 250 may be any text-to-HTML converter. For example, Frame Maker™ has text-to-HTML conversion ability. Original documents 200 are also used as inputs to background converter 255, which outputs graphics files 204. A method and apparatus for implementing the background converter will be discussed in greater detail below. HTML documents 202 and graphics files 204 are then combined to generate HTML files having single-layered backgrounds 210, which are appropriate format for use on the Web.

Figure 3:
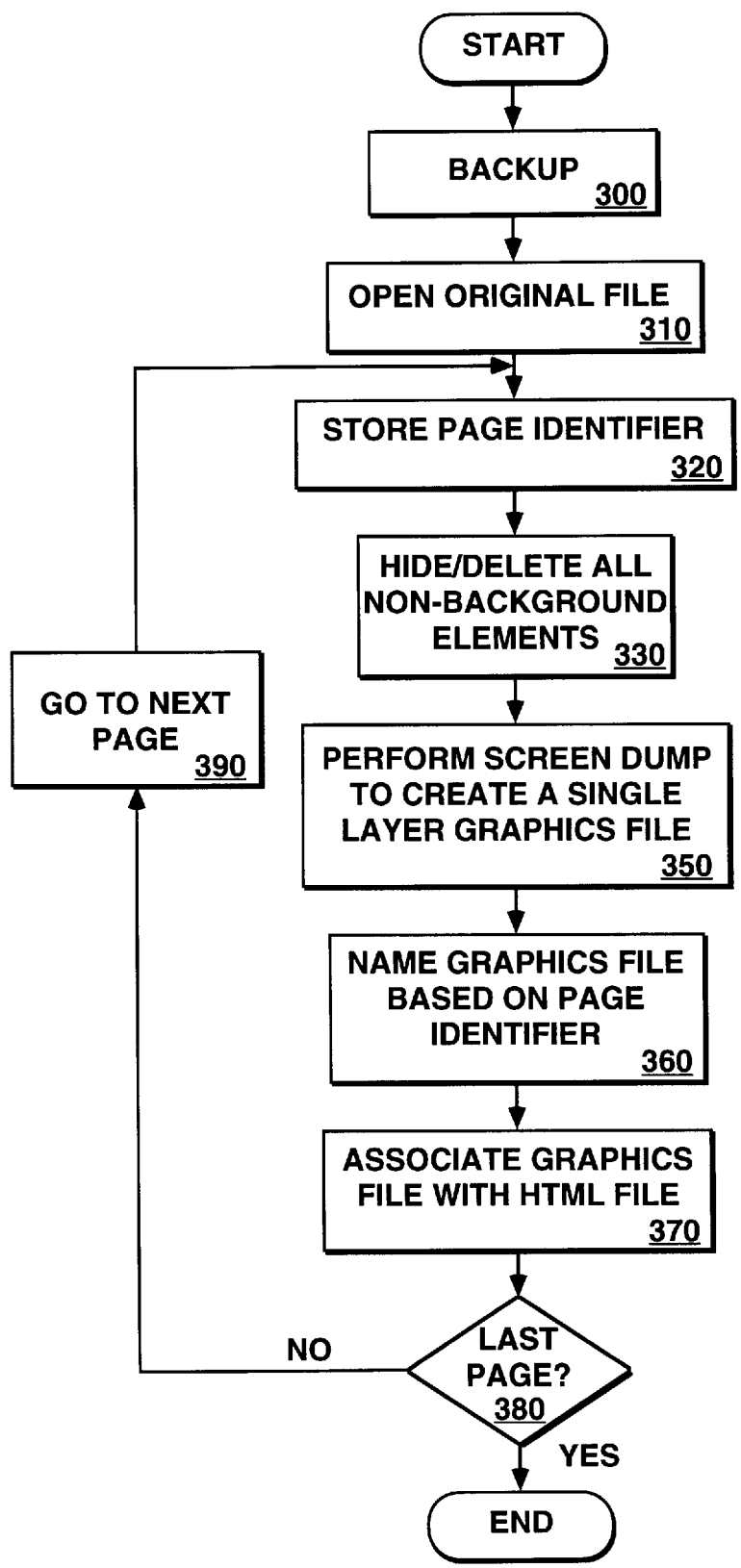
FIG. 3 is a flow diagram of the process of automatically generating a plurality of documents having single-layered backgrounds based on a corresponding plurality of original documents having multi-layered backgrounds, according to one embodiment of the present invention.

FIG. 3 is a flow diagram for automatic generation of a multi-page document with single-layered backgrounds from a multi-page document with multi-layered backgrounds according to one embodiment of the present invention. For the purposes of explanation, specific commands and sequences will be given hereafter with reference to the HyperTalk™ scripting language, which is associated with HyperCard™. However, HyperTalk™ and HyperCard™ are merely exemplary scripting and authoring systems. The present invention is not limited to any particular scripting language, programming language, or hypertext authoring system.

In step 300, a backup copy is made of the hypertext document to be converted to HTML. While step 300 is not required, making a backup copy allows the backup document to be processed and modified without the worry of corrupting the original document. By maintaining the original document, the author may use the original authoring environment to perform later revisions to the document. For example, the original authoring environment may be used to modify the layered backgrounds rather than attempting to modify the single-layered backgrounds of the corresponding HTML document.

Figure 4:
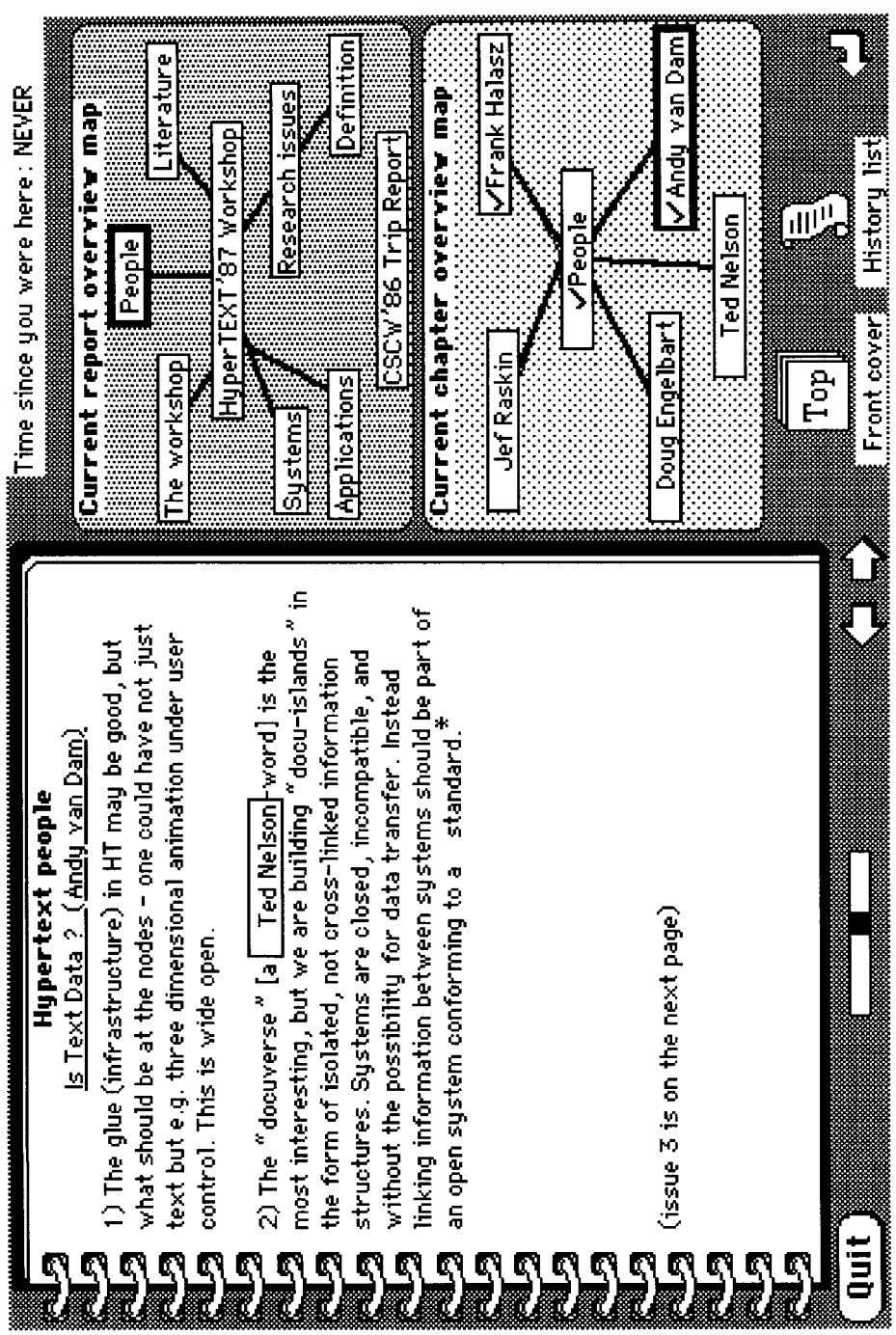
FIG. 4 shows an exemplary document having a multi-layered background.

In step 310, the original structured document having one or more pages is opened. FIG. 4 shows a page of an exemplary HyperCard™ document that may be converted to an HTML document using the techniques described herein. Starting with the first page, an identifier that identifies the current page is stored for later use (step 220). The page identifier may be, for example, the name or number of the page. If the original document is a HyperCard™ document, the Page Identifier command may be used to retrieve an identifier associated with the current page. In hypertext environments that do not supply their own page identifiers, a page identifier may be created. For example, sequential page numbers may be generated and stored in step 320.

Figure 5:
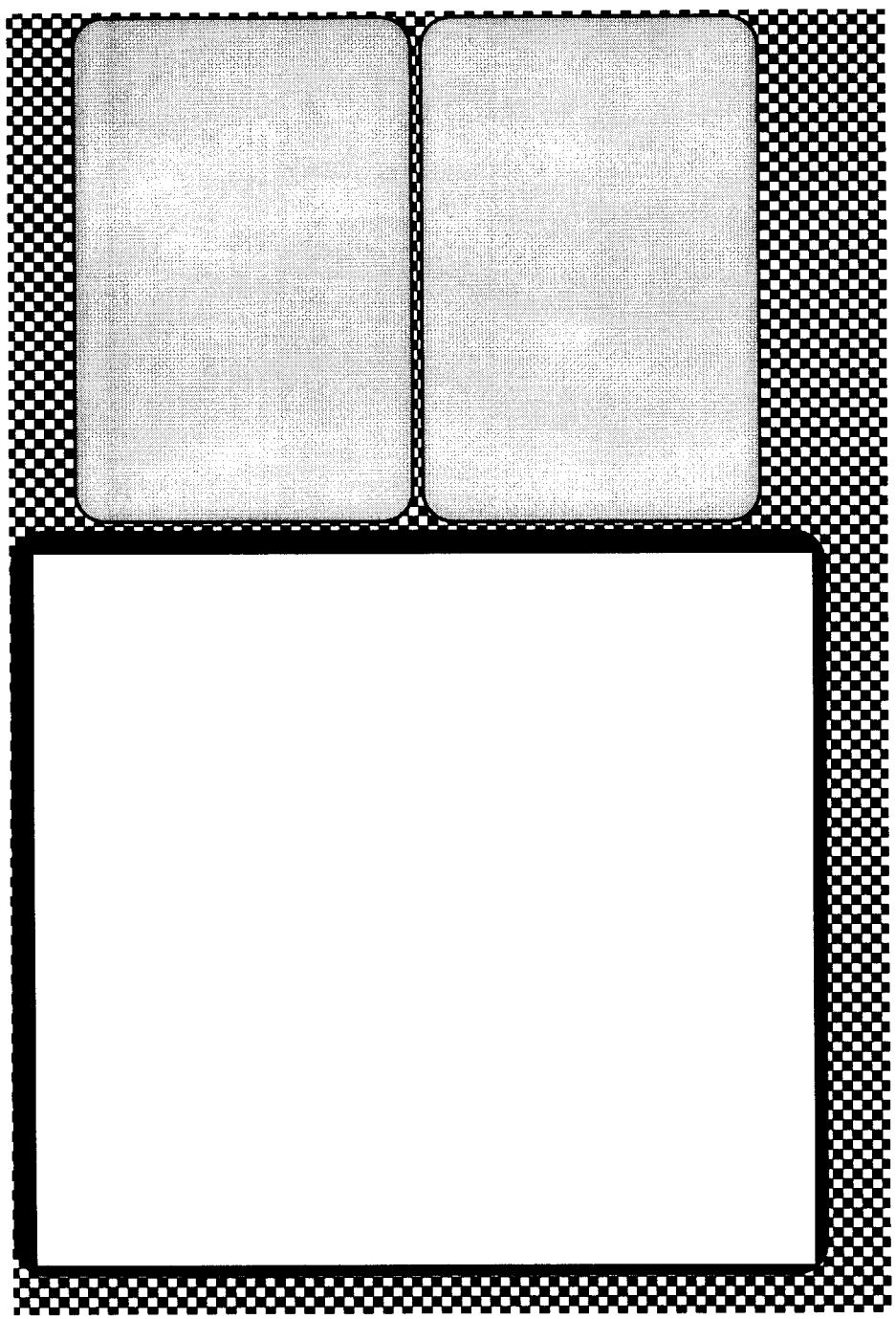
FIG. 5 shows the exemplary multi-layered document of FIG. 4 with all non-background elements removed.

In step 330, all non-backdrop elements on the current page of the structured document are either hidden or deleted. After step 330 is performed on the exemplary page of FIG. 4, the page will appear as shown in FIG. 5. Step 330 may be performed by using, for example, the HyperCard™ commands "hide card field" and "hide card button". Specifically, the text on the current page of a HyperCard™ document can be hidden by executing the "hide card field i" command, where "i" goes from 1 to the number of text fields on the current page. Similarly, the buttons on the current page can be hidden by executing the "hide card button i" command, where "i" goes from 1 to the number of buttons on the current page.

Once all non-backdrop elements are either hidden or deleted, a screen dump of the region of the screen that displays the current page is performed at step 350. Specifically, the interapplication control system of the underlying operating system (e.g. AppleScript, OLE and/or VisualBasic) is used to send a message to a screen dump program. Capture™, available from Mainstay of Agoura Hills, Calif., and Snapshot™, available from SunSoft of Mountain View, Calif. are two of many available screen dump programs that may be used to perform the screen dump at step 340.

The screen dump program generates and stores a single-layered graphical image of the multi-layered background in a target graphics format. For example, the screen dump program may store the image in JPEG or any other appropriate graphics format.

In step 360, the graphics file generated in step 350 is renamed based on the page identifier determined in step 320. According to one embodiment, the graphics file is renamed <PAGENAME>_BKG.XXX, where "<PAGENAME>" represents page identifier determined in step 320 and XXX represents a file extension that identifies the format of the graphics file. For example, if the page identifier stored in step 220 were "1," step 360 and the graphics file was stored in the GIF file format, the graphics file would be given the name "1_BKG.GIF". Alternately, the desired name may be sent to screen dump program to cause the screen dump program to initially save the graphics file under the selected name.

In step 370, the graphics file created in step 350 is associated with the HTML page for which the graphics file will be a background. The HTML page includes the HTML code to display the text that was on the original hypertext page. To associate the graphics file with the HTML page, a line is inserted in the HTML file with reference to the background graphics file. For example, the line "<BODY BACKGROUND=PAGENAME_BKG.GIF>" may be inserted.

If the graphics file generated in steps 320–370 is based on the last page of the original document, the generation process is complete. Otherwise, steps 320 through 380 are repeated for each page in the original document. The next page can be accessed, for example, by using the "go next page" HyperCard™ command. Once all pages in the original file are processed according to steps 320 through 370, the generation process for the original file is complete. The copy of the original hypertext document in which all non-background elements have been deleted or hidden may then be deleted.

The particular sequence of steps described above is merely exemplary. The sequence of the steps may vary from implementation to implementation. For example, references to the single layer graphics files may be inserted into the appropriate HTML pages after all of the pages have been processed. In addition, a step of restoring the non-background elements may be performed after a screen dump has been performed for a page, thus eliminating the need to make a backup of the original document before processing.

While embodiments of the invention have been described in which a screen dump routine is used to create a single layer graphics file of background elements, other graphics-generating mechanisms may be used. For exmaple, a program may be designed to automatically (1) read a page of a hypertext document from a file stored in a format that supports multi-layered backgrounds, and (2) remove the non-background elements of the page, and (3) generate a single layer graphics file of the page without the non-background elements. These steps may be performed with or without actually displaying the page on a screen.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for converting a document that includes a plurality of pages from a first format that supports multi-layered backgrounds to a second format that does not support multi-layered backgrounds, the method comprising the steps of:

for each page of said plurality of pages, performing the steps of
generating target code in the second format for displaying non-background elements of the page;
causing the page to be displayed without non-background elements;
generating a single layer graphics file of the page based on the displayed page; and
associating said target code with said single layer graphics file according to the second format.

2. The method of claim 1, further comprising the step of:
for each page of said plurality of pages, performing the steps of
storing a page identifier that identifies said page; and
naming the single layer graphics file generated from said page based on said page identifier.

3. The method of claim 1 wherein the step of generating a single layer graphics file of the page based on the displayed page comprises making a screen dump of the displayed page.

4. The method of claim 1, wherein:
the second format is HyperText Markup Language (HTML);
the target code is an HTML page; and
the reference identifies said single layer graphics file as a background for said HTML page.

5. The method of claim 1 wherein the steps of
causing the page to be displayed without non-background elements, and
generating a single layer graphics file of the page based on the displayed page
are automatically performed for each page of said plurality of pages by executing a script file.

6. The method of claim 1 wherein the step of causing the page to be displayed without non-background elements includes the steps of:
executing a program that displays the page based on a copy of said document that is in said first format; and
executing a sequence of commands that causes said program to cease to display non-background elements of the page.

7. The method of claim 6 wherein the sequence of commands includes commands for hiding each visual element of a particular type of visual element on the page.

8. The method of claim 2 wherein the step of making a screen dump of the displayed page includes using an inter-application control system to send a message to a screen dump program.

9. The method of claim 1 further comprising the steps of:
copying a first file that contains said document in said first format to create a second file that contains said document in said first format;
selecting one of said first file and said second file to be used as a basis for generating a single layer graphics file for each page of said plurality of pages; and deleting said selected file after generating said single layer graphics file for each page of said plurality of pages.

10. The method of claim 1 wherein the step of associating said target code with said single layer graphics file according to the second format includes embedding a reference to said single layer graphics file in said target code.

11. A computer-readable medium having stored thereon sequences of instructions for converting a document that includes a plurality of pages from a first hypertext format that supports multi-layered backgrounds to a second hypertext format that does not support multi-layered backgrounds, the sequences of instructions including instructions which, when executed by a process, would cause the processor to perform the steps of:

for each page of said plurality of pages, performing the step of
causing the page to be displayed without non-background elements;
generating a single layer graphics file of the page based on the displayed page; and
storing in target code a reference to said single layer graphics file according to the second hypertext format, wherein said target code is code generated in the second hypertext format for displaying non-background elements of the page.

12. The computer-readable medium of claim 11, further comprising instructions for performing the step of:

for each page of said plurality of pages, performing the steps of
storing a page identifier that identifies said page; and
naming the single layer graphics file generated from said page based on said page identifier.

13. The computer-readable medium of claim 11 wherein the step of generating a single layer graphics file of the page based on the displayed page comprises making a screen dump of the displayed page.

14. The computer-readable medium of claim 11, wherein:
the second hypertext format is HyperText Markup Language (HTML);
the target code is an HTML page; and
the reference identifies said single layer graphics file as a background for said HTML page.

15. The computer-readable medium of claim 11 wherein the steps of
causing the page to be displayed without non-background elements, and
generating a single layer graphics file of the page based on the displayed page
are automatically performed for each page of said plurality of pages by executing a script file.

16. The computer-readable medium of claim 11 wherein the step of causing the page to be displayed without non-background elements includes the steps of:
executing a program that displays the page based on a copy of said document that is in said first hypertext format; and
executing a sequence of commands that causes said program to cease to display non-background elements of the page.

17. The computer-readable medium of claim 16 wherein the sequence of commands includes commands for hiding each visual element of a particular type of visual element on the page.

18. The computer-readable medium of claim 12 wherein the step of making a screen dump of the displayed page includes using an interapplication control system to send a message to a screen dump program.

19. The computer-readable medium of claim 11 further comprising instructions for performing the steps of:
copying a first file that contains said document in said first hypertext format to create a second file that contains said document in said first hypertext format;
selecting one of said first file and said second file to be used as a basis for generating a single layer graphics file for each page of said plurality of pages; and
deleting said selected file after generating said single layer graphics file for each page of said plurality of pages.

20. A computer system comprising:
a storage medium having stored thereon a first file that contains a document in a first hypertext format that supports multi-layered backgrounds, the document comprising a plurality of pages;
a display device;
a first hypertext environment configured to displaying a current page of said document on said display device based on said first file;
a single-layered background generation mechanism configured to automatically process each page of said plurality of pages, wherein said single-layer background generation mechanism processes each page by performing the steps of
causing said first hypertext environment to cease to display any non-background elements on said current page;
causing to be generated a single-layer graphics file of said current page without said non-background elements; and
causing said first hypertext environment to display a next page of said plurality of pages, said next page being established as a new current page.

21. The computer system of claim 20 further comprising:
a second file stored on said storage medium, wherein said second file contains non-background elements of said document in a second hypertext format that does not support multi-layered backgrounds; and
a mechanism configured to automatically embed references to each single-layer graphics file into said second file, said references causing background elements of a page to be displayed behind non-background elements of the page when the document is displayed based upon the second file by a mechanism that reads said second hypertext format.

22. A method for converting a document that includes a plurality of pages from a first hypertext format that supports multi-layered backgrounds to a second hypertext format that does not support multi-layered backgrounds, the method comprising the steps of:
for each page of said plurality of pages, performing the steps of
generating target code in the second hypertext format for displaying non-background elements of the page;
causing a program that reads said first hypertext format to remove non-background elements from the page;
generating a single layer graphics file of the page based on the displayed page; and
associating said target code with said single layer graphics file according to the second hypertext format.

* * * * *